(12) United States Patent
Kuehnle et al.

(10) Patent No.: US 11,657,647 B2
(45) Date of Patent: *May 23, 2023

(54) SYSTEM AND METHOD FOR ADJUSTING RECORDING MODES FOR DRIVER FACING CAMERAS

(71) Applicant: Bendix Commercial Vehicle Systems LLC, Avon, OH (US)

(72) Inventors: Andreas U. Kuehnle, Villa Park, CA (US); Zheng Li, Irvine, CA (US); Hans M. Molin, Mission Viejo, CA (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,918

(22) Filed: Jun. 15, 2022

(65) Prior Publication Data

US 2022/0309807 A1 Sep. 29, 2022

Related U.S. Application Data

(63) Continuation of application No. 17/242,668, filed on Apr. 28, 2021, now Pat. No. 11,393,224, which is a continuation of application No. 16/664,626, filed on Oct. 25, 2019, now abandoned.

(51) Int. Cl.
*G06V 20/59* (2022.01)
*H04N 5/232* (2006.01)
(Continued)

(52) U.S. Cl.
CPC .......... *G06V 40/161* (2022.01); *B60W 40/09* (2013.01); *G06V 10/22* (2022.01); *G06V 20/59* (2022.01);
(Continued)

(58) Field of Classification Search
CPC ...... G06V 10/22; G06V 20/59; G06V 40/161; H04N 5/23219; B60W 40/09
See application file for complete search history.

(56) References Cited

U.S. PATENT DOCUMENTS 10,657,795 B1 * 5/2020 Laurans ................. G07C 9/33
11,393,224 B2 * 7/2022 Kuehnle .............. H04N 23/611
(Continued)

FOREIGN PATENT DOCUMENTS

WO WO-2018039646 A1 * 3/2018 ............ B60R 11/04

OTHER PUBLICATIONS

"DrivAid: Augmenting Driving Analytics with Multi-Modal Information"—Bozhao Qi, Peng Liu, Tao Ji, Wei Zhao, Suman Banerjee; 2018 IEEE Vehicular Networking Conference (VNC) (Year: 2018).*
(Continued)

*Primary Examiner* — Mainul Hasan
(74) *Attorney, Agent, or Firm* — Cheryl L. Greenly; Brian E. Kondas; Eugene E. Clair (57) ABSTRACT

A system for recording vehicle occupants and their immediate environment includes a driver-facing camera for capturing video data, an input that receives data from one or more sensors configured to detect vehicle related data and a processor. The processor is configured to embed, based on the sensor data, at least one indicator in a portion of the video data. The indicator designates that the portion of the video data is to be obscured during playback of the video data.

15 Claims, 7 Drawing Sheets

(51) Int. Cl.
   *B60W 40/09* (2012.01)
   *G06V 40/16* (2022.01)
   *H04N 23/611* (2023.01)
   *H04N 23/65* (2023.01)
   *H04N 23/667* (2023.01)
   *G06V 10/22* (2022.01)

(52) U.S. Cl.
   CPC ......... *H04N 23/611* (2023.01); *H04N 23/651* (2023.01); *H04N 23/667* (2023.01)

(56) References Cited

U.S. PATENT DOCUMENTS

| | | | | |
|---|---|---|---|---|
| 2011/0273621 | A1* | 11/2011 | Richardson | H04N 21/4728 348/E5.077 |
| 2015/0183372 | A1* | 7/2015 | Lambert | G07C 5/008 701/36 |
| 2018/0255276 | A1* | 9/2018 | Shou | H04N 7/188 |
| 2018/0278896 | A1* | 9/2018 | Schimelpfenig | H04N 5/76 |
| 2021/0370879 | A1* | 12/2021 | Julian | H04L 67/06 |

OTHER PUBLICATIONS

"Context-Based Driver Support System Development: Methodology and Case Study"—Alexey Kashevnik, Igor Lashkov, Vladimir Parfenov, Nikolay Mustafin, Olesya Baraniuc; 2017 21st Conference of Open Innovations Association (FRUCT). (Year: 2017).*

* cited by examiner

SYSTEM AND METHOD FOR ADJUSTING RECORDING MODES FOR DRIVER FACING CAMERAS

CROSS REFERENCE TO RELATED APPLICATION

This application is a continuation of the pending U.S. patent application Ser. No. 17/242,668 entitled "System and Method for Adjusting Recording Modes for Driver Facing Camera" filed Apr. 28, 2021, which is a continuation of the abandoned U.S. patent application Ser. No. 16/664,626 entitled "System and Method for Adjusting Recording Modes for Driver Facing Camera" filed Oct. 25, 2019, the entire disclosures of which are incorporated fully herein by reference.

FIELD OF THE INVENTION

The invention relates to adjusting recording modes of driver facing cameras and, in particular, to adjusting recording modes of driver facing cameras in response to the detection of certain events, which allows for the recording of driver activity during periods and at levels of detail that minimize the invasion of driver privacy.

BACKGROUND

Current methods of capturing driving data include capturing video data via one or more driver facing cameras. However, such driver facing cameras have the potential to invade driver privacy, particularly during rest periods in which the driver may be located in a bunk area visible to the driver facing cameras. Recording during under these circumstances is potentially intrusive and is often unnecessary, and may lead to an insufficiently rested and resentful driver.

The current approach for limiting the potential intrusion of driver privacy is to simply turn off the driver facing camera. However, aside from the inconvenience of having to manually operate the driver facing camera, this known approach can be overly restrictive in that even permissible data is not collected while the driver facing camera is turned off. Moreover, even if non-video data continues to be collected while the driver facing camera is turned off, there will still be gaps in or desynchronization of the data since there is no corresponding video data to associate with any other event data that may have been collected.

As such, there is a need in the art for a system and method that overcomes the aforementioned drawbacks.

SUMMARY OF THE INVENTION

In one embodiment of the invention, a system for recording vehicle occupants and their immediate environment using multiple recording modes of a camera is provided. The system includes a driver-facing camera having a plurality of recording modes. At least one of the recording modes is preferably an obscuring mode in which the image provided by the video data is partially or wholly obscured. The system also includes an input configured to receive vehicle related data from one or more sensors that detect the vehicle related data, including one or more of: time, driver and/or passenger location in the vehicle, vehicle behavior, parking brake status, ignition status. A processor is also provided, which is configured to determine a mode-changing event based on the detected vehicle related data, and to alter the recording mode of the driver-facing camera in response to determining the mode-changing event.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention In certain embodiments, the invention may be implemented by an on-vehicle event detection and reporting system that may include one or more driver facing cameras that are configured such that the field of view of the camera(s) captures a view the driver of the vehicle, and/or a view of other areas of the cabin, such as the driver controls of the vehicle while driving. Still other embodiments may include cameras configured to capture other scenes relative to the vehicle. For instance, embodiments may include cameras configured to capture the scene in front of the vehicle, behind the vehicle, to either side of the vehicle, etc.

The event detection and reporting system may be further configured to collect and provide non-video data, including non-video event-based data corresponding to a detected driver or vehicle event that occurred at a particular point in time during a driving excursion. Such event-based data can include data collected from components of, or components interacting with, the event detection and reporting system.

These components can detect, in real time, driver or vehicle-related events that happen over the course of a driving excursion, or even outside of the driving excursion. The components can report such events to the detection and reporting system. Examples of events that may be detected and/or reported to/collected by the event detection and reporting system in real time include safety events, for example and without limitation, excessive acceleration, excessive braking, exceeding speed limit, excessive curve speed, excessive lane departure, lane change without turn signal, loss of video tracking, LDW system warning, following distance alert, forward collision warning, collision mitigation braking, collision occurrence, etc., and non-safety events, for example and without limitation, the driver logging in/out of a vehicle telematics system, the driver/passenger entering/leaving the vehicle, the driver/passenger occupying/vacating the bunk area, the driver occupying/vacating the driver seat, the vehicle engine being on/off, the vehicle gear being in park/drive, the parking brake being on/off, etc. Non-safety events may also include theft events, for example and without limitation, the presence of an unauthorized occupant accessing the vehicle, etc.

In accordance with an embodiment, the event detection and reporting system may use data collected directly from vehicle components (e.g., devices, sensors, or systems), and data collected from an analysis of vehicle video, to generate event datasets that correspond in time with one or more detected events. Event data generated for a detected event may be associated with captured video frames whose timeline spans or overlaps the time when the event was detected/collected. Event data generated from an event determined from processing of captured vehicle video may at least be associated with the video from which it was generated, but may also be associated with other captured video frames whose timelines span or overlap the time when the event was detected/collected (in these scenarios, the time may be calculated based on the video frame or frames from which the event object was derived).

The particular invention disclosed and claimed herein relates to a system and method for adjusting recording modes of driver facing cameras in response to the detection of mode-change events. In certain embodiments, this is achieved by entering a different mode of recording in response to detecting mode-change events, based on, for example, detected driver activity, vehicle state, telematics information, and/or safety events. This different mode of recording is characterized by the fact that the video data of the driver facing camera is altered in a manner which obscures the recorded image data, in whole or in part, or is otherwise not recorded. For example, modern imager chips have settings that control the video signal produced, including gain, exposure time, black clamping level, etc. One aspect of the invention is to provide a mode of recording in which one or more of these setting is modified (e.g., very low or very high gain, for example) in response to the detection.

Figure 1:
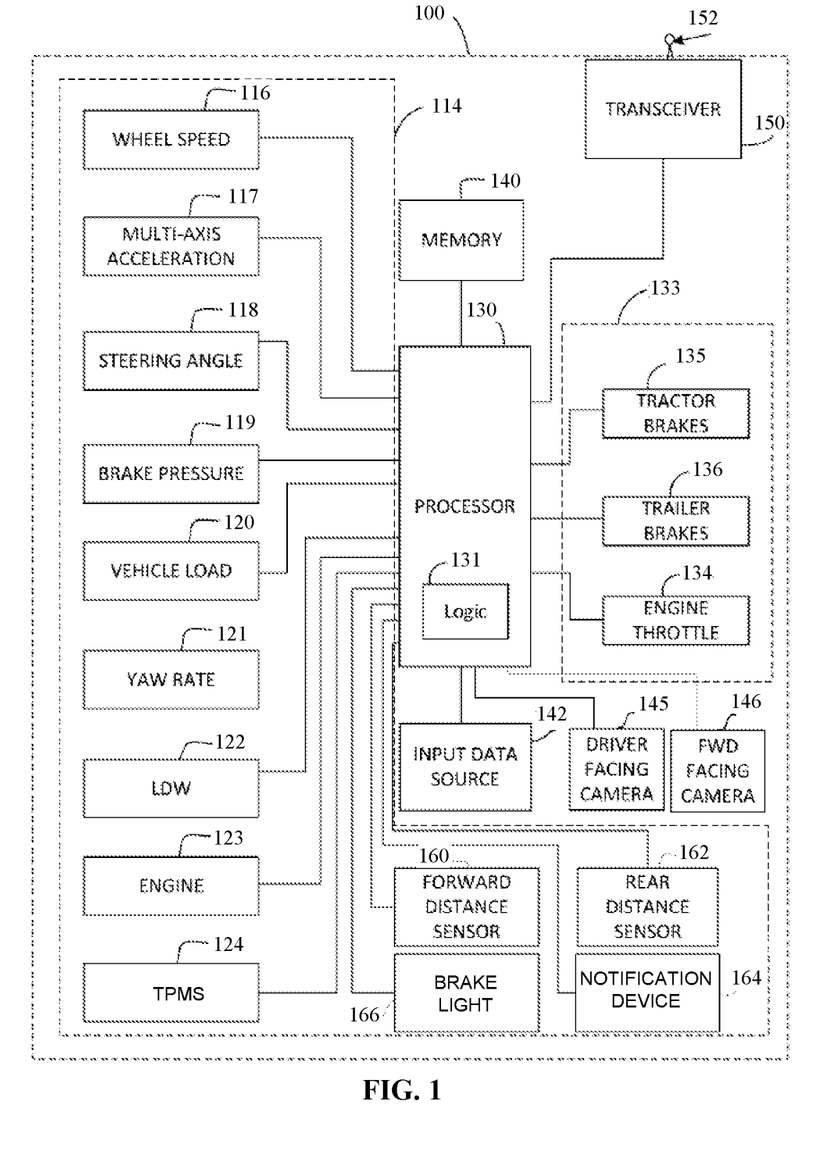
FIG. 1 is a block diagram that illustrates a vehicle-based computer system configured to implement one or more aspects of the invention.

Referring first to FIG. 1, by way of overview a schematic block diagram is provided illustrating details of an event detection and reporting system configured to be used in accordance with one or more exemplary embodiments of the invention. The in-vehicle event detection and reporting system 100 may be adapted to detect a variety of operational parameters and conditions of the vehicle and the driver's interaction therewith and, based thereon, to determine if a driving or vehicle event has occurred (e.g., if one or more operational parameter/condition thresholds has been exceeded). Data related to detected events (i.e., event data) may then be stored and/or transmitted to a remote location/server, as described in more detail below.

The event detection and reporting system 100 of FIG. 1 may include one or more devices or systems 114 for providing vehicle-related input data indicative of one or more operating parameters or one or more conditions of a commercial vehicle. Alternatively, the event detection and reporting system 100 may include a signal interface for receiving signals from the one or more devices or systems 114, which may be configured separate from system 100. For example, the devices 114 may be one or more sensors, such as but not limited to, one or more wheel speed sensors 116, one or more acceleration sensors such as multi-axis acceleration sensors 117, a steering angle sensor 118, a brake pressure sensor 119, one or more vehicle load sensors 120, a yaw rate sensor 121, a lane departure warning (LDW) sensor or system 122, one or more engine speed or condition sensors 123, and a tire pressure (TPMS) monitoring system 124. The event detection and reporting system 100 may also utilize additional devices or sensors, including for example a forward distance sensor 160 and a rear distance sensor 162 (e.g., radar, lidar, etc.). Other sensors and/or actuators or power generation devices or combinations thereof may be used of otherwise provided as well, and one or more devices or sensors may be combined into a single unit as may be necessary and/or desired.

The event detection and reporting system 100 may also include brake light(s) 166 and/or notification device 164, and may be usable to provide headway time/safe following distance warnings, lane departure warnings, and warnings relating to braking and or obstacle avoidance events.

The event detection and reporting system 100 may also include a logic applying arrangement such as a controller or processor 130 and control logic 131, in communication with the one or more devices or systems 114. The processor 130 may include one or more inputs for receiving input data from the devices or systems 114. The processor 130 may be adapted to process the input data and compare the raw or processed input data to one or more stored threshold values or desired averages, or to process the input data and compare the raw or processed input data to one or more circumstance-dependent desired value.

The processor 130 may also include one or more outputs for delivering a control signal to one or more vehicle systems 133 based on the comparison. The control signal may instruct the systems 133 to provide one or more types of driver assistance warnings (e.g., warnings relating to braking and or obstacle avoidance events) and/or to intervene in the operation of the vehicle to initiate corrective action. For example, the processor 130 may generate and send the control signal to an engine electronic control unit or an actuating device to reduce the engine throttle 134 and slow the vehicle down. Further, the processor 130 may send the control signal to one or more vehicle brake systems 135, 136 to selectively engage the brakes (e.g., a differential braking operation). A variety of corrective actions may be possible and multiple corrective actions may be initiated at the same time.

The event detection and reporting system 100 may also include a memory portion 140 for storing and accessing system information, such as for example the system control logic 131. The memory portion 140, however, may be separate from the processor 130. The sensors 114 and processor 130 may be part of a preexisting system or use components of a preexisting system.

The event detection and reporting system 100 may also include a source of vehicle-related input data 142 indicative of a configuration/condition of a commercial vehicle. The processor 130 may sense or estimate the configuration/condition of the vehicle based on the input data, and may select a control tuning mode or sensitivity based on the vehicle configuration/condition. The processor 130 may compare the operational data received from the sensors or systems 114 to the information provided by the tuning.

In addition, the event detection and reporting system 100 is operatively coupled with one or more driver facing imaging devices, shown in the example embodiment for simplicity and ease of illustration as a single driver facing camera 145 that is trained on the driver and/or trained on the interior of the cab of the commercial vehicle. However, it should be appreciated that one or more physical video cameras may be disposed on the vehicle such as, for example, a video camera on each corner of the vehicle, one or more cameras mounted remotely and in operative communication with the event detection and reporting system 100 such as a forward facing camera 146 to record images of the roadway ahead of the vehicle. In the example embodiments, driver data can be collected directly using the driver facing camera 145 in accordance with a detected driver head position, hand position, or the like, within the vehicle being operated by the vehicle. In addition, driver identity can be determined based on facial recognition technology and/or body/posture template matching.

Still yet further, the event detection and reporting system 100 may also include a transmitter/receiver (transceiver) module 150 such as, for example, a radio frequency (RF) transmitter including one or more antennas 152 for wireless communication of the automated control requests, GPS data, one or more various vehicle configuration and/or condition data, or the like between the vehicles and one or more destinations such as, for example, to one or more services (not shown) having a corresponding receiver and antenna. The transmitter/receiver (transceiver) module 150 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 is operative to combine selected ones of the collected signals from the sensor systems described herein into processed data representative of higher level vehicle condition data such as, for example, data from the multi-axis acceleration sensors 117 may be combined with the data from the steering angle sensor 118 to determine excessive curve speed event data. Other hybrid event data relatable to the vehicle and driver of the vehicle and obtainable from combining one or more selected raw data items from the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, average ACC usage event data, and late speed adaptation (such as that given by signage or exiting).

The event detection and reporting system 100 of FIG. 1 is suitable for executing embodiments of one or more software systems or modules that perform vehicle brake strategies and vehicle braking control methods according to the subject application. The example event detection and reporting system 100 may include a bus or other communication mechanism for communicating information, and a processor 130 coupled with the bus for processing information. The computer system includes a main memory 140, such as random access memory (RAM) or other dynamic storage device for storing instructions and loaded portions of the trained neural network to be executed by the processor 130, and read only memory (ROM) or other static storage device for storing other static information and instructions for the processor 130. Other storage devices may also suitably be provided for storing information and instructions as necessary or desired.

Instructions may be read into the main memory 140 from another computer-readable medium, such as another storage device of via the transceiver 150. Execution of the sequences of instructions contained in main memory 140 causes the processor 130 to perform the process steps described herein. In an alternative implementation, hard-wired circuitry may be used in place of or in combination with software instructions to implement the invention. Thus implementations of the example embodiments are not limited to any specific combination of hardware circuitry and software.

Figure 2:
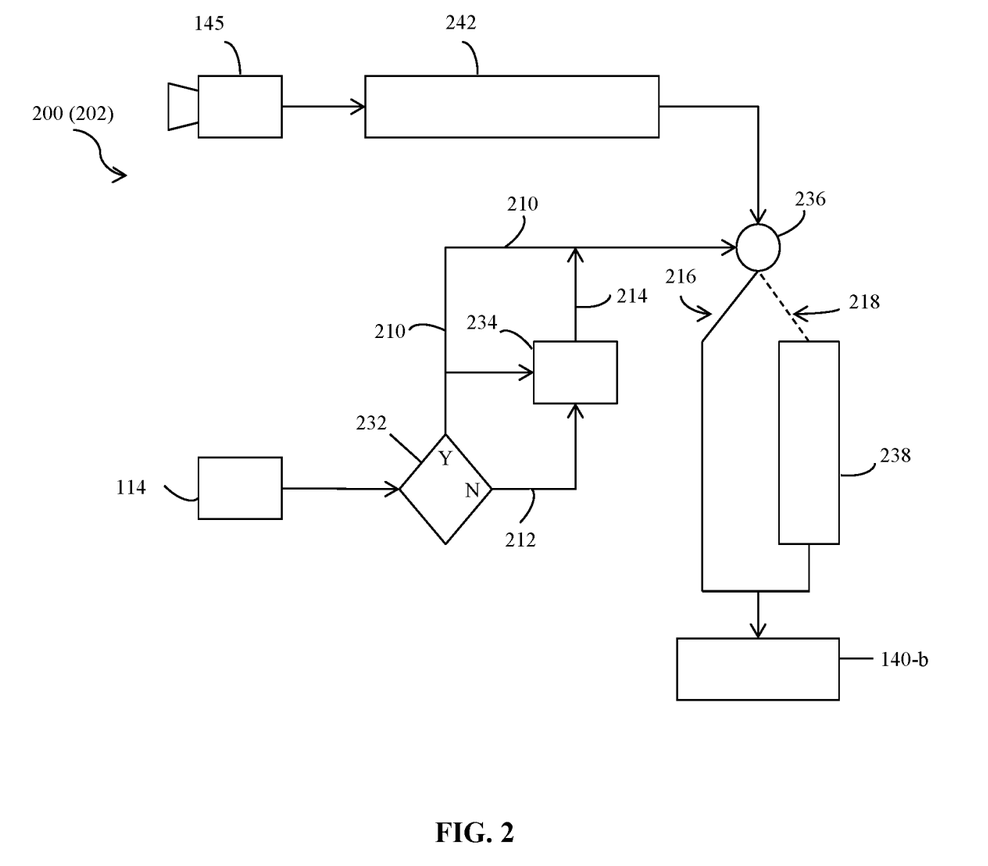
FIG. 2 is a schematic diagram of the operation of the systems and methods according to one or more aspects of the invention.
Figure 4:
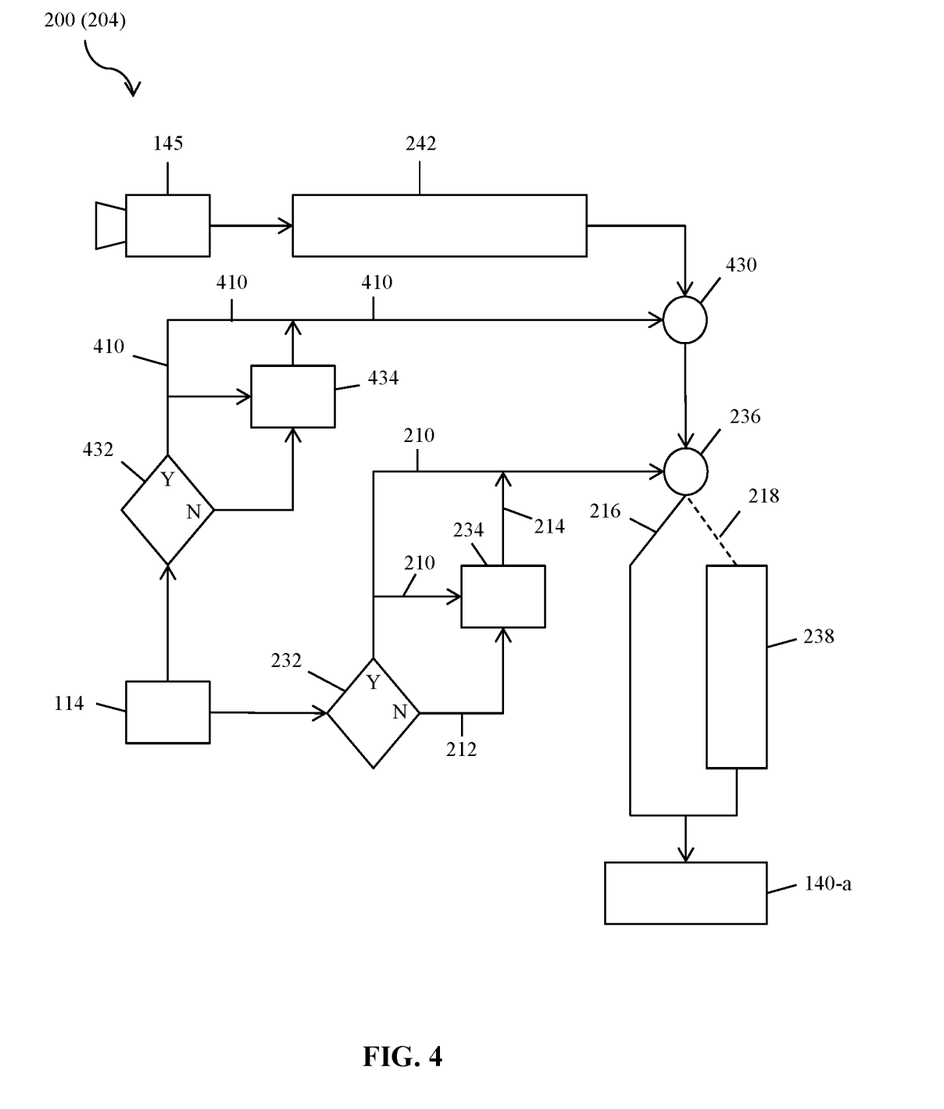
FIG. 4 is a schematic diagram of the operation of the systems and methods according to one or more aspects of the invention.
Figure 5:
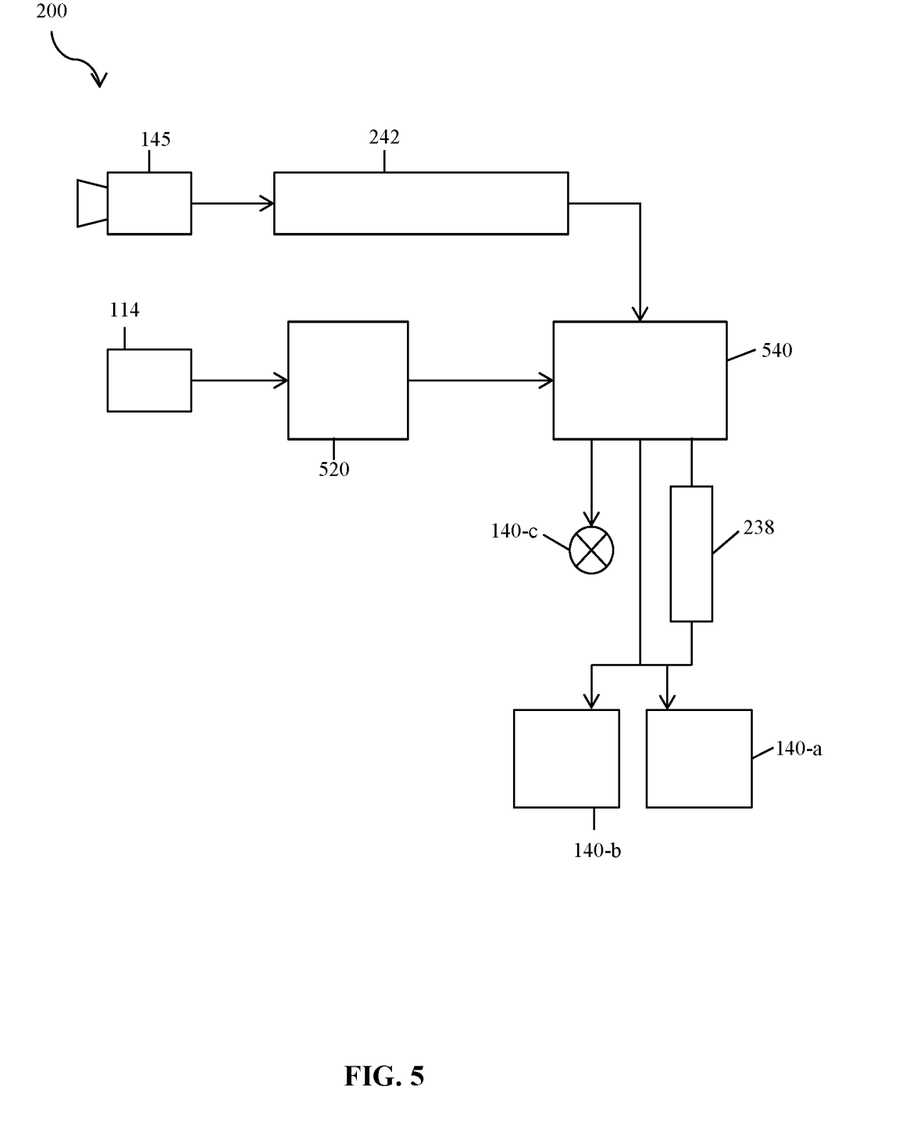
FIG. 5 is a schematic diagram of the operation of the systems and methods according to one or more aspects of the invention.

Referring now to FIGS. 2 and 4-5, simplified schematic block diagrams are provided illustrating details of the adjustment of the recording modes of driver facing camera system 200 in response to the detection of mode-change events via the event detection and reporting system of FIG. 1.

The driver facing camera system 200 includes one or more sensors, devices or systems 114 for providing input data, e.g., vehicle related data, indicative of one or more operating parameters or one or more conditions of a commercial vehicle, as discussed with reference to FIG. 1.

The driver facing camera system 200 also includes the driver facing camera 145 via which driver data, which is another form of vehicle-related data, including but not limited to, driver head position, hand position, location within the vehicle, identity, or the like, can be detected and collected. Driver data can be determined based on facial recognition technology and/or body/posture template matching. Passenger or other occupant data can be similarly detected and collected using the driver facing camera 145.

The driver facing camera can also function as a motion sensor, which detects activity through persistent/sufficient gain/exposure changes in the camera according to techniques known in the art. As such, the driver facing camera can act as another sensor 114 for providing vehicle related data. Situation dependent image control weighting may be utilized under such circumstances to identify areas of the camera image where relevant activity is to be detected. In particular, the image may be divided into a matrix of rectangular image areas, whose effect on the gain/exposure levels may be adjustably weighted to identify image areas for activity detection, i.e., motion detection. For example, the imager's gain/exposure dependence on the image areas corresponding to the bunk region in the image can be set to zero—so that activity in the bunk region does not register as an exposure change and therefore does not register as motion. In other words, the driver facing camera exposure control may be "blind" to changes in such image areas.

The driver facing camera system also includes a video-clip memory 140-*a* (FIG. 4) and a DVR memory 140-*b* (FIG. 2), each of which may comprise one or more distinct physical memories or memory locations within one or more common physical memories. In at least one embodiment, the video-clip memory 140-*a* and the DVR memory 140-*b* form part of the main memory 140 of the event detection and reporting system 100.

The driver facing camera 145, the processor 130 and the video-clip memory 140-*a* form a video-clip recorder 204 (FIG. 4), which is generally configured to record to the video-clip memory 140-*a* video data that has been captured by the driver facing camera 145 during a window of time in which a recording triggering event, e.g., a detected safety event or theft event, occurred (e.g., 10 seconds before to 10 seconds after the detected event).

In at least one embodiment, the video-clip recorder is enabled by the processor 130 when one or more of the following conditions is detected: (a) the driver is in the driver seat, (b) the engine is on, (c) a safety event has occurred, and (d) an unauthorized occupant is present without the driver. Otherwise, while the driver facing camera may be enabled for other purposes, e.g., motion detection, video-clip recording is preferably not enabled.

The driver facing camera 145, the processor 130 and the DVR memory 140-b form a DVR recorder 202 (FIG. 2), which is generally configured to record to the DVR memory 140-b video data on a continuous basis, irrespective of whether a safety event or theft event has been detected or not.

Figure 6A:
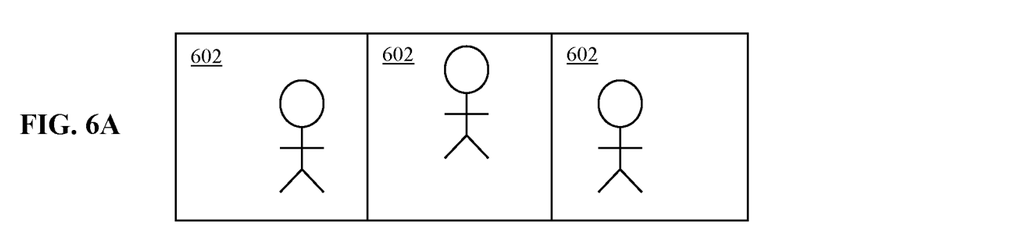
FIG. 6A to FIG. 6G illustrate various recording modes according to one or more aspects of the invention.

At any given time, the video-clip recorder 204 and/or the DVR recorder 202 can record to the respective memory 140-a, 140-b in accordance with one or more of a plurality of available recording modes, including: normal and unobscured recording modes. In the normal recording mode(s), the recorder records video data to the memory without obscuring the image, whereas in the obscured recording modes, the video data is recorded to the memory such that, on visual playback of the video data, the displayed image is visually obscured. FIG. 6A illustrates the normal or unobscured recording mode. FIGS. 6B-6G illustrate various obscured recording modes.

In some embodiments, different recording modes may be enabled for different image areas. In particular, the image may be divided into a matrix of rectangular image areas 602, and imaging parameters of each image area 602 may be controlled to obscure and un-obscure respective image areas in accordance with the desired recording mode. In some embodiments, the imaging parameters are adjustably weighted so as to obscure and un-obscure respective image areas 602. Control of the imaging parameters may be done via the processor 130 and/or the driver facing camera.

Accordingly, video data may be selectively obscured and/or unobscured for the image areas, i.e., areas-of-interest, that include one or more of the following vehicle regions: the driver seat, the passenger seat, between passenger and driver seats, the bunk area, the doors, the vehicle controls, the steering wheel, and the like. Video data may also be selectively obscured and/or unobscured for areas areas-of-interest that include the driver and/or passenger, or portions thereof, including but not limited to faces and other body parts. Transitions, spatial and/or temporal, between unobscured and obscured image areas, as well as between differently obscured image areas, may be gradual or sudden. Moreover, the obscuring may be reversible or irreversible.

In some embodiments, obscuring may be based, at least in part, on a personal preference of the driver, which may be tied to the driver's telematic log-in information, the facial recognition of the driver, or other type of recognition of the driver by the system. In such embodiments, a default mode may be enabled where the driver is not recognized, and/or there is no associated personal preference.

Exemplary approaches to obscuring/un-obscuring the video data in accordance with various recording modes will now be discussed.

Figure 6B:
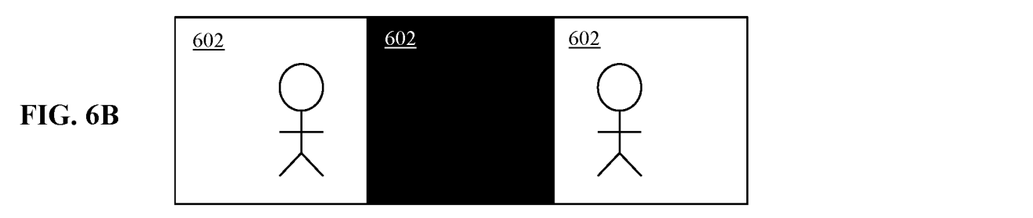

FIG. 6B illustrates a blacked-out mode, in which the brightness level of the image area can be set such that on playback the image area is visually unintelligible or of reduced visual intelligibility. For example, the brightness levels can be set to zero, resulting in a blacked out image area.

Figure 6C:
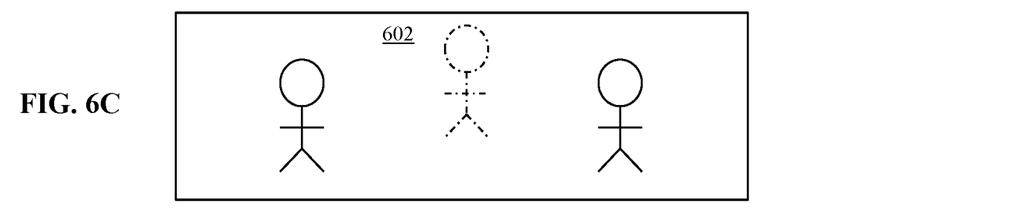

FIG. 6C illustrates a low-resolution mode, in which the spatial resolution levels of the image area can be set such that on playback the image area is visually unintelligible or of reduced visual intelligibility. For example, the resolution levels can be set to result in an image of such low-resolution as to be unintelligible.

Figure 6D:
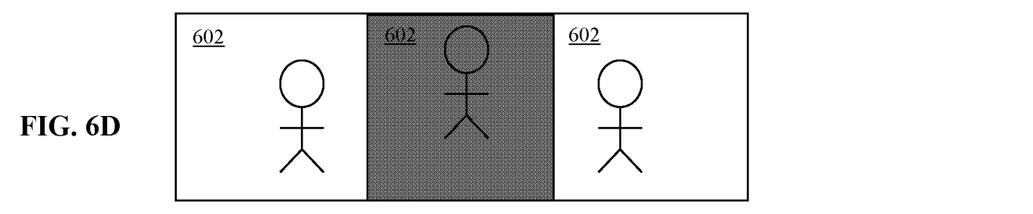

FIG. 6D illustrates a darkened mode, in which the grey levels of the image area can be set or remapped via mathematical transformation such that on playback the image area is visually unintelligible or of reduced visual intelligibility. For example, the grey levels can be set to zero, resulting in a shadowy blind spot. Alternatively, the grey levels can be set, limited or remapped to a set of low non-zero values, resulting in a "lost in deep shadow" image.

Figure 6E:
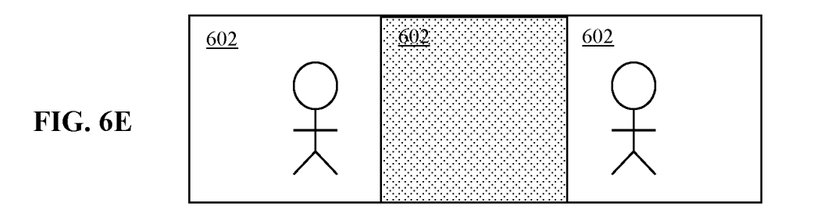

FIG. 6E illustrates an encrypted mode, in which the video data of the image areas can be encrypted such that on playback the image area is visually unintelligible or of reduced visual intelligibility. The encrypted video data may produce a default image in the affected image area, which may be for example, random pixel colors.

Figure 6F:
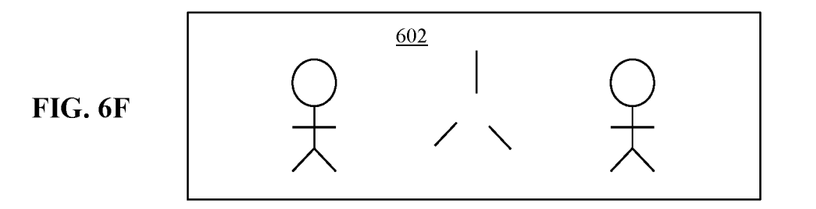

FIG. 6F illustrates a reduced mode, in which the color depth levels of the image area can be set such that on playback the image area is visually unintelligible or of reduced visual intelligibility.

In some embodiments, the obscured recording modes may include one or more blurred recording modes, in which video data is blurred such that on playback the image area is visually unintelligible or of reduced visual intelligibility. As used herein, blurring refers to the reduction of high-frequency content in the image area so as to visually obscure the image area. Such blurring may be achieved by controlling the contrast/resolution of the image area, applying a low-pass filter, adjusting the image data compression, subsampling, remapping pixel color levels into a compressed range, or by any other method known to selectively blur image data. In at least one embodiment, blurring is accomplished via replacing a pixel value with the average of its original value and the values of adjacent pixels, e.g., the nine adjacent pixels in a 3×3 matrix centered on the averaged pixel. This averaging reduces the local contrast and high-frequency content of the image, blurring it.

Figure 6G:
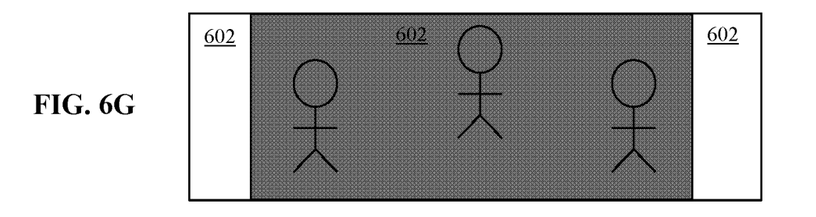

As discussed above, normal and obscured recording modes may be respectively enabled for different image areas or areas-of-interest. Thus, the recording modes may also include such arrangements of the normal and obscured recording modes within the image. For example, FIG. 6B illustrates a bunk-obscured mode in which the bunk area of the cabin is obscured while the driver and passenger seats are unobscured. As such, the privacy of bunk area users is maintained. Alternatively, FIG. 6G illustrates a peripheral vision mode, in which the regions of the doors are unobscured while everything between those regions is obscured. In the peripheral vision mode, the camera may also function as a motion sensor, as discussed herein. As such, the camera may monitor for the door(s) opening or remaining open, the windows being lowered or remaining lowered, etc.

Moreover, as shown for example in FIGS. 6C and 6F, the areas-of-interest can also be defined with respect to the driver and/or passenger, or portions thereof, including but not limited to faces and other body parts. In other words, obscuration may be locally tied to a vehicle occupant rather than cabin region. It will be understood, however, that some obscuration may be tied to the occupant, whereas other obscuration may be tied to cabin region.

In a split stream recording mode (not shown), the video data is separated by one or more defined characteristics and/or features. For example, high-frequency image content (i.e., fine detail image data) may be stored separately from low-frequency image content (i.e., coarse detail image data). For example, the recorder can average the values in n×n blocks of pixels, producing the low-frequency image for storage. The pixel-wise deviations from the n×n block averages may be separately stored as the high-frequency image content. An obscured video (or image area thereof) can therefore be replayed via the low-frequency image content, whereas an un-obscured video (or image area thereof) can be achieved by combining the high-frequency image content with the low-frequency image content. Alternatively, the all-frequency image content may be stored separately from low-frequency image content. An obscured video (or image area thereof) can therefore be replayed via the low-frequency image content, whereas an un-obscured video (or image area thereof) can be replayed via the all-frequency image content. The high-frequency/all-frequency image content may also be encrypted or otherwise access-restricted, so as to further facilitate driver privacy while permitting legitimate administrator access to the video recordings.

The split stream recording mode may separate the video data according to other characteristics and/or features, including but not limited to: face versus non-face areas, moving versus non-moving areas, etc. In this manner, for example, the spit stream recording mode may produce a playback image of a moving outline of a person with obscured internal content (e.g., darkened out or blurred) in an otherwise unobscured environment.

Obscuration may also vary with time and/or space. For example, the degree of blurring may be governed by the mathematical filtering that is applied to the image area. There is more blurring if a larger block of pixels is averaged together to replace the central value. In some embodiments, this block size can be varied over time or space. Near a driver's face or other location of interest, for example, a spatially extensive averaging can be applied, whereas far from such privacy sensitive areas, a less spatially extensive blurring can be applied. The spatially varying blur produces a 'things are sharp away from the driver but blurred when near to him' effect. Moreover, when a triggering event occurs, less blurring can be applied close in time to the event, whereas more blurring can be applied further in time from the event. This time-varying blur produces a 'things come into focus when it happens' effect.

It will be understood that other cameras may be operated according to the aforementioned recording modes, and that additional recording modes may be available for both driver facing cameras and other interior and/or exterior cameras. Other available modes may include: a full cabin mode, a short recording mode, a film mode, and a snapshot series mode, a long exposure mode, a defocus mode, a random time replacement mode, a time-varying random displacement of pixels mode, a color-pane-swap mode, etc.

The processor may switch the system between different recording modes based on the detection of one or more mode-change events, which may be determined based on, for example, detected driver activity, vehicle state, telematics information, and/or safety events. Exemplary mode-change events may include, for example and without limitation, ignition on/off, engine on/off, parking brake engaged/disengaged, gear in driver/park, driver seat occupied/unoccupied, bunk area occupied/unoccupied, occupant face recognized/unrecognized, telematics logged-in/logged-out, etc. For example, switching to an unobscured mode may be done in response to one or more of the following: a safety event occurs, the driver is detected in the driver's seat and the bunk is empty, the bunk is vacated, a passenger is detected entering the passenger seat, and the vehicle telematics system is logged into.

It will also be understood that the aforementioned description considers situations where the recorders are in an "on" state. However, it is further contemplated that the recorders may, individually or collectively, be in an "off" or "idle" state, in which no recording takes place. Transitioning between the "off" or "idle" states and the "on" state can be triggered by detected events, such as safety events, non-safety events and theft events.

In some embodiments, the recording mode is adjusted to a low-power, situation driven recording mode in response to the detection of the engine as being "off." In the low-power, situation driven recording mode, the recording may occur in response to a triggering event, e.g. a theft or safety event, while the engine is "off," and the recorded video data may be stored locally. The recorded video data may be transmitted to the server when the engine is restarted.

Figure 3:
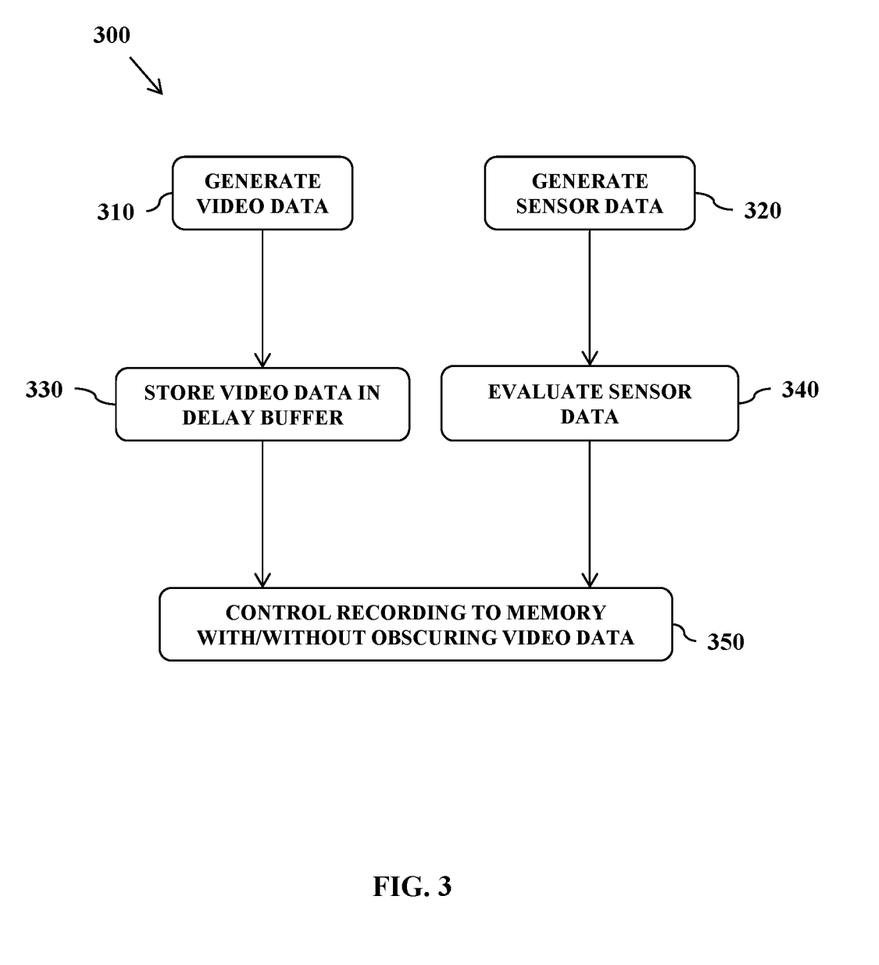
FIG. 3 illustrates at least one embodiment of a process for implementing one or more aspects of the invention.

Referring now to FIGS. 2-3, an operation of the obscuring/blurring of video data in accordance with the principles of the invention will now be discussed.

The operation begins at block 310, with the camera 145 generating video data of the captured image area. The video data may be captured on a continuous basis, or in response to a detected event. In certain embodiments, such data may comprise a sequence of video frames with separate but associated sensor data that has been collected from one or more on-vehicle sensors or devices, as detailed herein.

At block 320, the video data may be stored in a delay buffer 242. The delay buffer 242 provides a time delay from the capturing of the video data before it is recorded to the DVR memory 140-b via one of data paths 216 and 218, at block 340.

The state of switch 236 determines which of the data paths the video data takes to DVR memory 140-b, where it is stored. Where the switch is set to an un-obscured mode, the video data takes data path 216, which stores the video data in the DVR memory 140-b without being obscured. Where the switch is set to an obscuring mode, the video data takes data path 218, which sends the video data to an obscuring module 238, where it is partially or wholly obscured in accordance with the principles discussed herein, prior to storage in the DVR memory.

The control of the switching between obscuring modes will now be discussed. At block 310, the sensor data is generated by the one or more on-vehicle sensors or devices 114. At block 330, the sensor data is evaluated 232 via the processor 130 for the occurrence of an obscuring event, e.g., the detection of an occupant in the bunk area.

If the obscuring event is detected, a obscuring-mode control signal 210 is sent to the switch, at block 340. The control signal switches the data path of the video data exiting the delay buffer 242 from data path 216, which may be the default, to data path 218 and the obscuring module 238. The obscuring-mode control signal 210 is also sent to a timer 234 to reset the timer to a max count.

If no obscuring event is detected, either because the event has ended or has not started, a countdown control signal 212 is sent to the timer 234 to start a countdown from the max count. When the timer 234 counts down to zero, a reset signal 214 is sent to the switch 236, which resets the switch 236 so that video data from the delay buffer 242 travels along data path 216.

The durations of the delay buffer 238 and the max count determine the unobscured prequel and sequel lengths to the recording of the obscured event. As such, the video data can be obscured in close to real time, with appropriate prequel and sequel periods.

The obscuring module 238 can obscure the video data, wholly or in part, by any method of obscuring video data, including those methods discussed herein. The video data can be obscured directly, in which the video data is recorded to the memory 140 as obscured video data. The video data can also be obscured indirectly, in which case the obscuring module 238 adds or otherwise embeds one or more flags or other indications to the video data instructing a playback module (not shown) to appropriately obscure the flagged video data during playback. Such flags may identify to the playback module which parts of the video image to obscure, as well as when to start/stop the obscuring. In one or more embodiments, the obscuring module 238 may be configured to add a value set to the video data. The value set may indicate a degree, type, and local image area coverage for an obscuration region to be applied to the video data and used to obscure the video data at the off-vehicle server.

It will be understood that while the illustrative altering of the video data is described in terms of obscuring the video data, the video data can be blurred or altered in other ways for driver privacy, as discussed herein.

The playback of the recorded video may also be affected by access levels associated with the video data and/or the obscuration. The obscured video data may be played back with image areas obscured by default operation. However, one or more of the obscured image areas may be associated with a corresponding access level or encryption key. As such, the one or more of the obscured image areas may be "revealed" in accordance with provided access rights of the viewing party or the providing of the encryption key via a video player. For example, law enforcement, insurance companies, and/or driver may have access to view obscured image areas. The various obscured images may be associated with corresponding access levels based on the detected circumstances that trigger the obscuration. Moreover, the access levels may be stored in the metadata of the video data.

In some embodiments, a degree of obscuration, including non-obscuration, may be stored in the metadata of the video data and may be adjustable during playback. Accordingly, the timestamped detected circumstances may be correlated with the degree of obscuration such that the degree of obscuration for an image frame or series of image frames can be adjusted based on the type of detected circumstances associated with the image frame(s). For example, facial obscuration may be eliminated on playback, whereas bunk area obscuration may not—or vice versa. In this manner, just as the degree, type, appropriate circumstances and conditions of the obscuration applied to the recording may be set, so too can the degree, type, relevant circumstances and person-specificities of the revealed recording be set.

It will further be appreciated that the video and non-video data may be timestamped based on a central or common clock such that the video and non-video data can be cross-referenced using the timestamps. Similarly, embedded tags within the video and/or non-video data may be used to correlate the data sets. Additionally, non-video data may be correlated to video data by storing the non-video data in the frame headers. One or more techniques for storing video and non-video data in an associated fashion, whether in a single memory or in separate memories, are described in detail in U.S. application Ser. No. 16/208,375, entitled "System and Method for Providing Complete Event Data from Cross-Referenced Data Memories," which is assigned to the assignee hereof, and the entire disclosure of which is hereby incorporated by reference.

An audio and/or visual indicator, such as for example, a small light on the dashboard or in the cabin, may also be provided to indicate that recording is in progress. Accordingly, the indicator may be operatively coupled to the processor and responsive to processor commands to turn on/off in connection with the recording.

The principles of the invention may also be applied to audio recordings captured by one or more microphones, independently or in connection with the cameras.

Turning now to FIGS. 3-4, the principles of the invention are illustrated as applied to the video-clip recordings. The operation is substantially similar to the operation discussed with reference to FIGS. 2-3, and for the sake of brevity will only be discussed briefly with the understanding that one of ordinary skill in the art will readily appreciate the similarities without undue and duplicative description.

At block 310, the sensor data is evaluated 432, via the processor, for the occurrence of a recording triggering event, e.g., a safety event. If the recording triggering event is detected, a video-clip control signal 410 is sent to switch 436 at block 340. The video-clip control signal 410 allows the video data to be sent to the data paths 216 and 218 to be recorded, whereas the default state of switch 436 prevents recording of the video data. A video-clip timer 434 may also be utilized with the delay buffer 242, in similar manner to timer 234, to determine the unobscured prequel and sequel lengths to the recording of the recording triggering event.

The principles of the invention may also be applied to both the video-clip recorder and the DVR recorder in tandem, as shown for example in FIG. 5. Here, the sensor data is provided to a combined evaluation unit 520 that controls a combined switching unit 540, which in turn directs the video data from the delay buffer 242 to a state of not being recorded 140-c, or to the appropriate memory 140-a, 140-b via the obscuring module 238 or not, as appropriate in accordance with the principles discussed herein.

It should further be appreciated that correlated obscured and unobscured data may be transmitted by the on-vehicle event detection and reporting system to a remote server using, for example, wireless transceiver 150 of FIG. 1. This transmission of event data may be done automatically in response to the occurrence of a detected event, or on request.

Once the correlated event data has been transmitted from the on-vehicle event detection and reporting system to the remote server, whether automatically or upon request, the data may be provided to a user-side viewing portal or application. In certain embodiments, the viewing portal may comprise a web application provided on a user computer, such as the web application. It should further be appreciated that the viewing portal or application may be a dedicated software program executing on a computer or mobile device that is accessible to the user. Regardless of how the data is made available to a user-side device, the user will be able to view or otherwise discern only the unobstructed video data, while the details of the obscured video data remain visually obscured. And, since there are no data gaps despite at least some of the video data being obscured, the user will be able to engage in all of the same post-processing and data analysis, which is not otherwise dependent on the specific details of the obscured data.

It should further be appreciated that the system may further be configured to detect when obscuring image areas is no longer necessary and, in response thereto, automatically exit the obscuring mode(s) so that regular video data capturing and recording is resumed.

As used herein, the terms "camera" or "cameras" are intended to refer to any and all digital imaging devices, including but not limited to cameras. Moreover, references to "driver," "passenger," and "occupant," should be understood to be interchangeable, and the principles of the invention understood to apply as appropriate to each.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described herein with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 130 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition and further in accordance with the descriptions herein, the term "logic," as used herein, with respect to FIG. 1, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for recording a vehicle interior, comprising:
a driver-facing camera for capturing video data;
an input of a processor that receives data from one or more sensors configured to indicate a plurality of vehicle related events; and
the processor configured to embed at least one indicator in the video data in response to the plurality of vehicle related events; the at least one indicator including a first indicator identifying a start time to begin obscuring the video data, wherein the first indicator is embedded in the video data in response to receiving vehicle related event data indicating engagement of a parking brake of the vehicle.

2. The system of claim 1, wherein the at least one indicator further comprises a second indicator embedded in the video data identifying a stop time to end obscuring the video data.

3. The system of claim 2, wherein the second indicator is embedded in the video data in response to one or more vehicle related events, including driver location in the vehicle, a vehicle safety event, movement detection inside the vehicle and movement detection outside the vehicle.

4. The system of claim 2, wherein the second indicator is embedded in the video data in response to receiving vehicle related event data indicating disengagement of the parking brake.

5. The system of claim 1, further comprising a playback module that obscures the video data in response to the first indicator and ends obscuring of the video data in response to the second indicator.

6. The system of claim 5, wherein the playback module includes a gradual transition to unobscured video data after the second indicator.

7. The system of claim 1, wherein the at least one indicator includes a value set to indicate at least one of a degree, a type, and a local image area for a region to be obscured in the video data.

8. The system of claim 1, wherein obscuring the video data includes changing at least one of: frame rate, frame resolution, pixel colors, local defocus degree, contrast, detail level, compression ratio, pixel order, icon or fixed snapshot substitution, recording time, pixel content, exposure, brightness, obscuration boundaries, and recording activity.

9. The system of claim 1, further comprising:
a transceiver configured to transmit the video data having the at least one indicator to an off-vehicle server, the off-vehicle server associated with a playback module.

10. A method for recording a vehicle interior, comprising:
receiving data from one or more sensors indicating a vehicle related event;
receiving video data from a driver-facing camera; and
embedding in the video data a first indicator identifying a start time to begin obscuring of the video data wherein the first indicator is embedded in the video data in response to the data from the one or more sensors indicating engagement of a parking brake of the vehicle.

11. The method of claim 10, further comprising: embedding a second indicator in the video data identifying a stop time to end obscuring of the video data.

12. The method of claim 11, wherein embedding the second indicator occurs in response to the data from the one or more sensors indicating at least one of a driver location in the vehicle, a vehicle safety event, movement detection inside the vehicle and movement detection outside the vehicle.

13. The method of claim 11, wherein embedding the second indicator occurs in response to the data from the one or more sensors indicating a disengagement of the parking brake.

14. The method of claim 10, further comprising: transmitting the video data having the at least one indicator to an off-vehicle server, the off vehicle server having an associated playback module.

15. The method of claim 10, further comprising: playing back the video data on a playback module, wherein the playback module obscures the video data portion in response to the first indicator.

* * * * *